(12) United States Patent
Torgersrud et al.

(10) Patent No.: US 9,232,051 B2
(45) Date of Patent: *Jan. 5, 2016

(54) CALL MANAGEMENT FOR SECURE FACILITIES

(71) Applicant: Telmate, LLC, San Francisco, CA (US)

(72) Inventors: Richard Torgersrud, San Francisco, CA (US); Christopher Ditto, San Jose, CA (US); Morgan Collins, Dublin, CA (US)

(73) Assignee: Intelmate LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/580,199

(22) Filed: Dec. 22, 2014

(65) Prior Publication Data

US 2015/0207927 A1    Jul. 23, 2015

Related U.S. Application Data

(63) Continuation of application No. 13/843,461, filed on Mar. 15, 2013, now Pat. No. 8,917,848.

(51) Int. Cl.
*H04M 3/42* (2006.01)
*H04M 3/22* (2006.01)
*H04M 3/38* (2006.01)
*H04M 3/56* (2006.01)

(52) U.S. Cl.
CPC .......... *H04M 3/2281* (2013.01); *H04M 3/2218* (2013.01); *H04M 3/38* (2013.01); *H04M 3/56* (2013.01); *H04M 3/568* (2013.01); *H04M 2203/6081* (2013.01)

(58) Field of Classification Search
USPC ............................. 379/202.01, 88.02, 142.05
See application file for complete search history.

(56) References Cited

U.S. PATENT DOCUMENTS

| | | | |
|---|---|---|---|
| 8,648,894 B2* | 2/2014 | Laney et al. | 348/14.03 |
| 2007/0071206 A1* | 3/2007 | Gainsboro et al. | 379/168 |
| 2011/0206038 A1* | 8/2011 | Hodge | 370/352 |

* cited by examiner

*Primary Examiner* — Quynh Nguyen
(74) *Attorney, Agent, or Firm* — Osha Liang LLP

(57) ABSTRACT

A method for controlling a call in a first controlled facility includes connecting an inmate in the first controlled facility to the call when each party of the call is verified, testing incoming audio on the call to detect a controlled facility tone from a second controlled facility, and transmitting a notification of a violation by the inmate when the controlled facility tone is detected in the incoming audio.

19 Claims, 11 Drawing Sheets

CALL MANAGEMENT FOR SECURE FACILITIES

CROSS-REFERENCE TO RELATED APPLICATIONS

This application is a continuation of copending U.S. patent application Ser. No. 13/843,461, filed on Mar. 15, 2013, entitled "Call Management For Secure Facilities" and is herein incorporated by reference in its entirety, for all purposes.

BACKGROUND

Controlled facilities, such as a jail, prison, secure detention environments, detention facility, secured hospital, or addiction treatment facility, house large populations of individuals in confinement, which presents unique administrative challenges. In such detention environments, detained individuals, such as prisoners, offenders, convicts, military personnel, patients, government cleared personnel, or other detainees, frequently desire to communicate with individuals outside the detention environment such as friends or family members.

SUMMARY

In general, in one aspect, embodiments relate to a method for controlling a call in a first controlled facility. The method includes connecting an inmate in the first controlled facility to the call when each party of the call is verified, testing incoming audio on the call to detect a controlled facility tone from a second controlled facility, and transmitting a notification of a violation by the inmate when the controlled facility tone is detected in the incoming audio.

In general, in one aspect, embodiments relate to a system for controlling a call in a first controlled facility that includes a computer processor and a network application executing on the computer processor. The network application includes a connection module configured to connect an inmate in the first controlled facility to the call when each party of the call is verified. The call analysis module is configured to test incoming audio on the call to detect a controlled facility tone from a second controlled facility, and transmit a notification of a violation by the inmate when the controlled facility tone is detected in the incoming audio.

In general, in one aspect, embodiments relate to a non-transitory computer readable medium for controlling a call in a first controlled facility. The non-transitory computer readable medium includes computer readable program code for connecting an inmate in the first controlled facility to the call when each party of the call is verified, testing incoming audio on the call to detect a controlled facility tone from a second controlled facility, and transmitting a notification of a first violation by the inmate when the controlled facility tone is detected in the incoming audio.

In general, in one aspect, embodiments relate to a method for controlling a multiparty call in a detention center that includes receiving a request to connect an inmate in the detention center to parties in the multiparty call, verifying that each party is authorized to speak with the inmate, verifying that each party accepts the multiparty call before being connected to the inmate, and connecting each party that is authorized and that accepts to the multiparty call.

Other aspects of the invention will be apparent from the following description and the appended claims.

DETAILED DESCRIPTION

Figure 1:
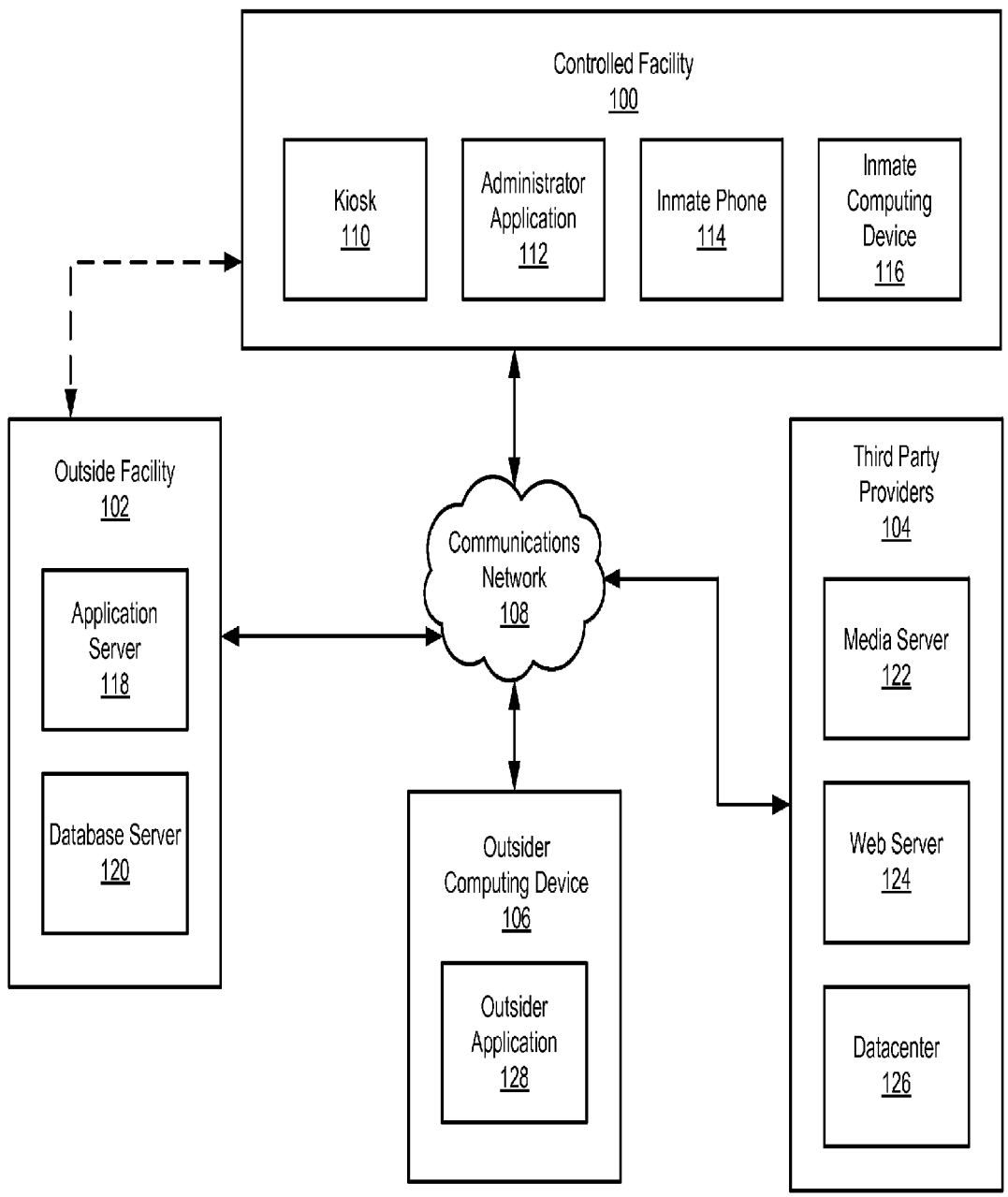
FIGS. 1-7 show schematic diagrams of a system in one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for controlling a call in a controlled facility. The call may be a single one-to-one call or a multiparty call. A multiparty call is a telephone call having more than two parties. For example, an inmate may call a second party, and the second party may call a third party. The second party may stay on the multiparty call or may leave the multiparty call. Further, the second party may be a person or software. The call may include text, audio, and video. Embodiments of the invention include functionality to determine whether an inmate is violating any rules during the call. For example, one rule may be that inmates may not contact inmates in other controlled facilities. In such an example, a controlled facility adds a tone to the audio in the call. When another controlled facility receives the call, the controlled facility may detect, based on the tone, that the call is from another controlled facility and, thus, that the inmate is violating the rule.

Embodiments of the invention may include interactions with a secure social network. In one or more embodiments of the invention, a secure social network is a network application that facilitates and secures the exchange or transmission of information between two or more parties in which at least one of those parties is subject to special security or law enforcement restrictions or otherwise resides in, or is subject to the controls of a controlled facility. Exchanged or transmitted information may be member generated, such as a photo or a video message, or it may be member-curated, such as a news headline, a famous quote, or a sports score.

FIG. 1 shows a diagram of a system in accordance with one or more embodiments of the invention. As shown in FIG. 1, the system includes a controlled facility (100), an outside facility (102), third party providers (104), and an outsider computing device (106) each communicatively coupled to a communications network (108). The controlled facility (100) may include, but is not limited to, a kiosk (110), an administrator application (112), an inmate phone (114), and an inmate computing device (116). The outside facility (102) may include an application server (118) and a database server (120). The third party providers (104) may include a media server (122), a web server (124), and a datacenter (126). The outsider computing device (106) may include an outsider application (128).

In one or more embodiments of the invention, a controlled facility (100) is an access-restricted location. Examples of controlled facilities (e.g., controlled facility (100)) include, but are not limited to, detention environments (e.g., jails, prisons, etc.), immigration detention centers, military centers, government secure sites, law enforcement holding structures, secure business complexes, and psychiatric hospitals.

In one or more embodiments of the invention, an inmate is a person within a controlled facility (100) who is subject to one or more restrictions, primarily to his or her freedom or rights. Examples of inmates include, but are not limited to, prisoners, wards of the state, parolees, employees working in a secure business complex, temporary or long-term internees, patients, military personnel, uncharged suspects, and refugees. Inmate restrictions may be part of a court imposed sentence on an inmate, while others may be specific to the controlled facility (100) in which the inmate resides. Restrictions may include limitations on an inmate's physical movement (i.e., physical restrictions) and limitations on the inmate's ability to communicate (i.e., communication restrictions). Communication restrictions include inmate use restrictions, inmate target restrictions, and device use restrictions.

In one or more embodiments of the invention, inmate use restrictions are limitations on an inmate's general ability to communicate with visitors and/or outsiders. Inmate use restrictions may include, for example, periods of time in which an inmate is not allowed to communicate with outsiders or visitors (e.g., between 10 PM and 8 AM, during an imposed one-week punitive period, etc.) and limitations based on lack of funds (e.g., insufficient commissary account balance to initiate a communication).

In one or more embodiments of the invention, inmate target restrictions are limitations on the target or source of a communication with the inmate. Inmate target restrictions may be specific outsiders or visitors with whom the inmate is not allowed to communicate (e.g., the victim of a crime perpetrated by the inmate, etc.). Inmate target restrictions may also include types of people with whom the inmate is not allowed contact (e.g., outsiders who are ex-cons, minors under the age of 18, etc.).

In one or more embodiments of the invention, device use restrictions are restrictions based on the condition or state of the communication device used by the inmate. Device use restrictions include, for example, limitations based on the location of the inmate's mobile device, limitations imposed based on a determination that the device has been tampered with, etc.

In one or more embodiments of the invention, an outsider is a person outside the controlled facility (100) who may be the source or target of a communication with an inmate. An outsider who enters the controlled facility (100) for the purpose of communicating with an inmate is referred to as a visitor.

In one or more embodiments of the invention, the kiosk (110) is a computing system with functionality to facilitate communication between an inmate and a visitor or outsider. Such communication facilitation may include creating a system identity data item or secure social networking account, adding or importing contact information for outsiders with whom the inmate wishes to communicate, uploading media (e.g., photos, videos, audio, and text) to, or viewing media from, a secure social network, sending or receiving messages or other media, acting as an endpoint for voice and video communication between an inmate and a visitor or outsider, scheduling a communication, and managing a commissary or communications account. Further detail about kiosks (e.g., kiosk (110)) is provided in FIG. 2, FIG. 5A, FIG. 5B, and FIG. 6.

In one or more embodiments of the invention, the administrator application (112) is a process or group of processes executing on a computing system with functionality to enable an administrator to create, remove, and/or enforce one or more restrictions on an inmate. In one or more embodiments of the invention, an administrator is a person associated with the controlled facility charged with enforcing one or more restrictions. Examples of administrators include, but are not limited to, prison guards, orderlies, wardens, prison staff, jailers, information technology technicians, system administrators, and law enforcement agents. Using the administrator application, an administrator may retrieve or alter the identity data item and/or secure social network account of an inmate, visitor, or outsider. Further detail about the administrator application (112) is provided in FIG. 2.

In one or more embodiments of the invention, the inmate phone (114) is a device with functionality to send and receive audio communications between an inmate and an outsider or visitor. In one or more embodiments of the invention, the inmate phone (114) is a stationary (i.e., non-mobile) device. Further, a single inmate phone (114) may be used by more than one inmate. Further detail about the inmate phone (114) is provided in FIG. 2.

In one or more embodiments of the invention, the inmate computing device (116) is a computing device with functionality to enable an inmate to communicate with a visitor or outsider. Specifically, the inmate computing device (116) may be used to send or receive text messages and/or initiate or receive voice or video calls. In one or more embodiments of the invention, the inmate computing device (116) also enables an inmate to access a secure social network. Specifically, the inmate computing device (116) may be used to upload media to, or view media from, a secure social network account of the inmate or another secure social network member. In one or more embodiments of the invention, the inmate computing device (116) is a mobile computing device (e.g., a smartphone, a laptop, a tablet, etc.). Further detail about the inmate computing device (116) is provided in FIG. 2 and FIG. 6.

In one or more embodiments of the invention, the elements within the controlled facility (100) are communicatively coupled to the communications network (108). In one or more embodiments of the invention, the communications network (108) is a collection of computing systems and other hardware interconnected by communication channels. The communications network (108) may include networks that are exclusively or primarily used for a single type of communication, such as a telephone network (e.g., Plain Old Telephone System (POTS)), and/or networks used for a wide array of communication types, such as the Internet through Voice over IP (VOIP). Communication channels used by the communications network (108) may include, for example, telephone lines, networking cables, wireless signals, radio waves, etc. Fees charged and payments received by the provider(s) of the communications network (108) may involve multiple parties, including a service provider of the outside facility (102), the management of the controlled facility (100), and provider(s) of the communications network (108). In one or more embodiments of the invention, fees may be split between multiple parties based on the terms of underlying agreements or contracts between the parties. Further, rebates, reimbursements, and/or refunds may be afforded to and paid to the management of the controlled facility (100) based on the terms of underlying agreements or contracts between the parties. For example, the management of the controlled facility (100) may receive a rebate from the service provider of the services provided to inmates based on such factors as the volume of use, the dollar amount, and/or the frequency of use.

In one or more embodiments of the invention, the outside facility (102) is a group of computing systems located outside of the controlled facility (100). Specifically, the outside facility (102) may house system elements with functionality to facilitate communication between inmates and outsiders, access communication data between inmates and outsiders, and enforce one or more restrictions imposed on inmates and inmate communications. In one or more embodiments of the invention, the outside facility (102) is connected directly to the controlled facility (100) bypassing a generally accessible communications network (communications network (108)). One or more of the components within the outside facility (102) may alternatively be located within the controlled facility (100) or within the third party providers (104).

In one or more embodiments of the invention, the application server (118) is a computing system with functionality to authenticate an inmate, outsider, administrator, reviewer, or investigator for access to system functionality (e.g., initiating voice or video calls, sending text messages, etc.) or data stored on the database server (120) (e.g., inmate identities, communications between inmates and outsiders, etc.). The application server may authenticate inmates, outsiders, administrators, reviewers, and/or investigators using passwords, biometric data, digital access codes, and/or physical access devices. Further detail about the application server (118) is provided in FIG. 3.

In one or more embodiments of the invention, the database server (120) is a computing system with functionality to store identities used to authenticate inmates, outsiders, administrators, reviewers, and/or investigators. Such identities may include verified data used to compare to verification data provided by the inmate, outsider, administrator, reviewer, or investigator to authenticate the inmate, outsider, administrator, reviewer, or investigator.

In one or more embodiments of the invention, the database server (120) also stores communication data about communications between an inmate and an outsider or visitor. Such communication data may include, for example, a recording of a video call, the length of a voice call, the frequency of video calls, sent and received text messages, etc. The database server (120) may also store media submitted to a secure social network before, during, and/or after the media has been reviewed. Further detail about the database server (120) is provided in FIG. 3.

In one or more embodiments of the invention, the third party providers (104) are computing systems that provide network application and data storage services (i.e., cloud computing services). Third party providers (104) may include service providers used directly by inmates and outsiders, such as photo sharing services, general social networking sites, and digital music retailers. Third party providers (104) may include service providers employed by administrators and for use by inmates and outsiders, such as audio and video streaming applications, conferencing applications, and secure social network media storage. One or more of the components within the third party providers (104) may alternatively be located within the controlled facility (100) or the outside facility (102).

In one or more embodiments of the invention, the media server (122) is a computing system or group of computing system with functionality to provide network application services to facilitate communication between an inmate and an outsider, and to facilitate access to a secure social network. Such services include, but are not limited to, VoIP services, video conferencing services, and media streaming services.

In one or more embodiments of the invention, the web server (124) is a computing system or group of computing system with functionality to provide an interface to access and interact with webpages and other network application services. In one or more embodiments of the invention, the web server (124) is a type of media server (122).

In one or more embodiments of the invention, the datacenter (126) is a computing system or group of computing system with functionality to provide an interface to access and interact with data stored on one or more data servers (not shown). In one or more embodiments of the invention, the datacenter (126) is a type of media server (122).

In one or more embodiments of the invention, the outsider computing device (106) is a computing device with functionality to execute the outsider application (128). In one or more embodiments of the invention, the outsider computing device (106) is a mobile computing device (e.g., a smartphone, a laptop, a tablet, etc.). Further detail about the outsider computing device (106) is provided in FIG. 6.

In one or more embodiments of the invention, the outsider application (128) is a process or group of processes (in software, firmware, hardware, or combination thereof) with functionality to enable communication between an outsider and an inmate. Specifically, the outsider application (128) may be used to send or receive text messages and/or initiate or receive voice or video calls. In one or more embodiments of the invention, the outsider application (128) also enables an outsider to access a secure social network. Specifically, the outsider application (128) may be used to upload media to, or view media from, a secure social network account of the outsider, an inmate, other secure social network member.

Figure 2:
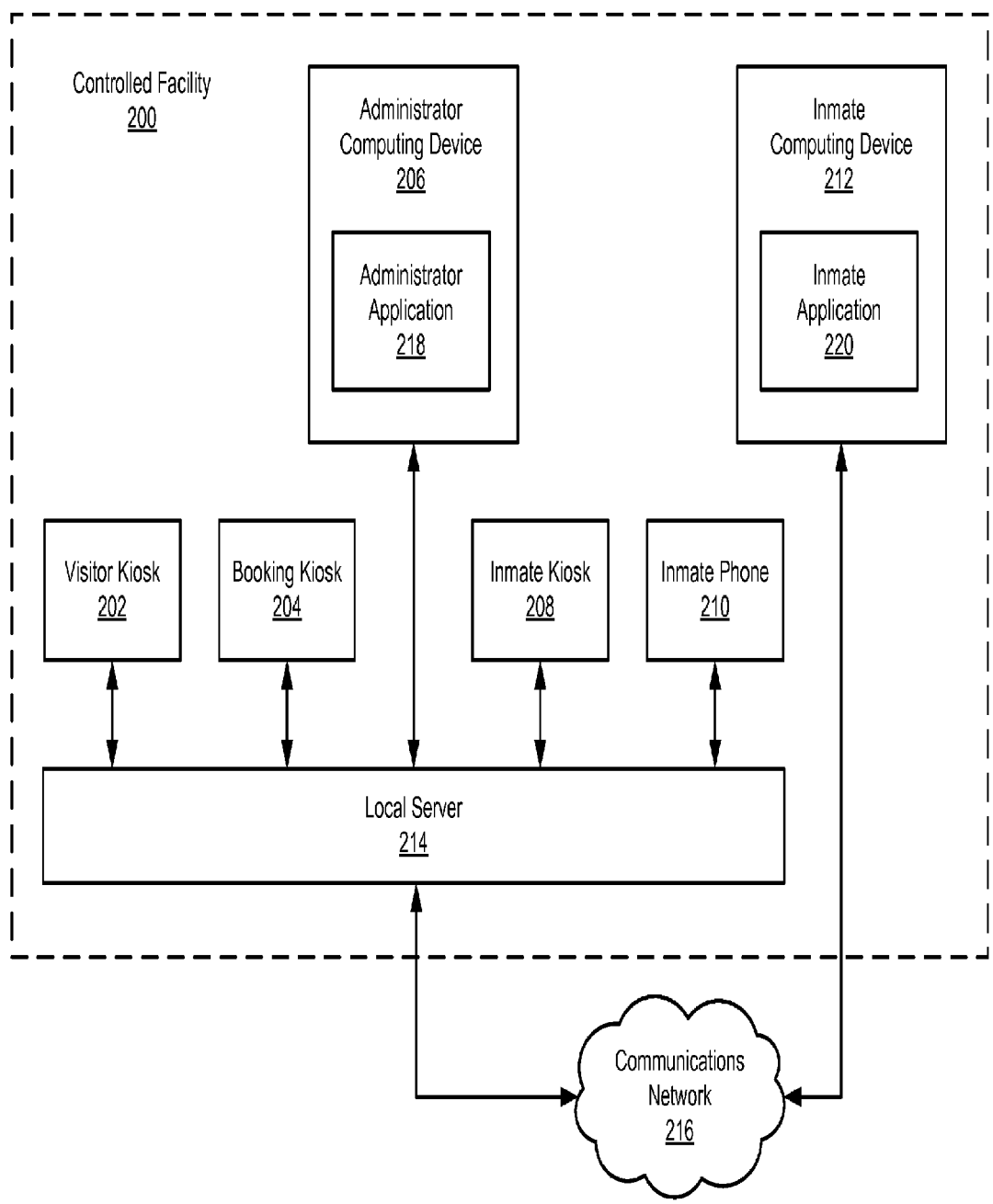

FIG. 2 shows a controlled facility in accordance with one or more embodiments of the invention. As shown in FIG. 2, the controlled facility (200) may include a visitor kiosk (202), a booking kiosk (204), an administrator computing device (206), an inmate kiosk (208), an inmate phone (210), an inmate computing device (212), and a local server (214). The inmate computing device (212) and the local server (214) are communicatively coupled to the communications network (216). The administrator computing device (206) includes an administrator application (218). The inmate computing device (212) includes an inmate application (220).

In one or more embodiments of the invention, the visitor kiosk (202) is a computing system with functionality to facilitate communication between an inmate and a visitor. Specifically, the visitor kiosk (202) may be a combination of computing hardware and software used by a visitor to make and receive voice and video calls to/from an inmate residing in the same controlled facility (200) or another controlled facility (not shown). The visitor kiosk (202) may also be used to schedule a voice or video call with an inmate for a future date. Further, the visitor kiosk (202) may also include the functionality to exchange media (e.g., photos, videos, and audio) with an inmate residing in the controlled facility (200). The visitor kiosk (202) may include functionality to generate such media, such as a camera, microphone, keyboard, and software to record or otherwise create media to send to an inmate. Such media may be subject to review before being delivered.

In one or more embodiments of the invention, a visitor wanting to use a visitor kiosk (202) may be required to participate in an authentication process to verify the identity of the visitor. The authentication process may include creating an identity data item and verified data for storage and later comparison. The verified data used for authentication may be a username and password combination and/or biometric information about the visitor.

In one or more embodiments of the invention, the visitor kiosk (202) includes functionality to access a secure social network. Specifically, the visitor kiosk (202) may be used by a visitor to create and manage a secure social network account. The visitor kiosk (202) may also be used by a visitor to upload digital media to the visitor's secure social network account or the account of another secure social network member. The visitor kiosk (202) may further be used to view digital media uploaded to the visitor's social network account or the account of another secure social network member.

In one or more embodiments of the invention, the visitor kiosk (202) includes functionality to manage a commissary account for one or more inmates. Specifically, a visitor may use a visitor kiosk (202) to add money to the commissary account of an inmate in the controlled facility (200), view a transaction history of the commissary account, transfer funds between commissary accounts, and/or remove funds from a commissary account. Further detail about the visitor kiosk (202) is provided in FIG. 5A and FIG. 5B.

In one or more embodiments of the invention, the booking kiosk (204) is a computing system with functionality to aid administrators in admitting an inmate into a controlled facility (e.g., controlled facility (200)). Specifically, the booking kiosk (204) may include functionality to create or update an inmate identity data item. Specifically, the booking kiosk (204) may be used to obtain verified data (e.g., passwords, biometric data, etc.) and save the verification data in one or more identity data items for the inmate. The verified data may then be used to authenticate the inmate (e.g., to access the communications network (216), etc.). In one or more embodiments of the invention, the booking kiosk may also be used to associate one or more restrictions with the inmate via the inmate's identity data item.

In one or more embodiments of the invention, the booking kiosk (204) includes functionality to input contact information for visitors, outsiders, administrators, or other inmates with whom the inmate wants to communicate. Such contact information may then be associated with the inmate's identity data item, and may be used to initiate a voice or video call, or otherwise transmit media to visitors, outsiders, or other inmates. Further, in one or more embodiments of the invention, the contact information may be retrieved from an inmate's mobile computing device (e.g., cell phone, smart phone, etc.) or a local or remote data storage device (e.g., a flash drive, a webmail account, etc.). The contact information may be retrieved using a wired or wireless connection between the booking kiosk and the inmate's mobile computing device and/or the data storage device. The contact information may be subject to review before the inmate is permitted to contact the visitor, outsider, administrator, or other inmate.

In one or more embodiments of the invention, the booking kiosk (204) includes functionality to prepare a mobile computing device for use by the inmate within the controlled facility (200). Specifically, a controlled facility (200) may allow inmates the use of computing devices while in or subject to the controlled facility (200). However, use of such inmate computing devices may require that the computing device is instrumented with software restricting the use of the inmate computing device. The booking kiosk (204) may be used to instrument the inmate computing device as required. Further detail about the booking kiosk (204) is provided in FIG. 5A and FIG. 5B.

In one or more embodiments of the invention, the administrator computing device (206) is a computing system or group of computing systems with functionality to execute the administrator application (218). In one or more embodiments of the invention, the administrator application (218) is a process or group of process with functionality to provide access to communications between inmates at the controlled facility (200) and visitors, outsiders, administrator, and other inmates. The administrator application (218) may also be used to monitor current voice or video calls between an inmate and a visitor, outsider, administrator, or other inmate.

In one or more embodiments of the invention, the administrator application (218) is used to manage an identity data item associated with an inmate. Such management may include altering the restrictions (device use restrictions, inmate use restrictions, and inmate target restrictions) applicable to the inmate. In one or more embodiments of the invention, the administrator application (218) is used to access the secure social network account of an inmate, visitor, or outsider. In one or more embodiments of the invention, the administrator application (218) may provide heightened access (i.e., a level of access greater than that of the inmate, visitor, or outsider) to data stored in the secure social networking account.

In one or more embodiments of the invention, the inmate kiosk (208) is a computing system with functionality to facilitate communication between an inmate and a visitor or outsider. Specifically, the inmate kiosk (208) may be a combination of computing hardware and software used by an inmate to make and receive voice and video calls to/from a visitor, outsider, or another inmate residing in another controlled facility (not shown). The inmate kiosk (208) may also be used to schedule a voice or video call with a visitor at a future date. Initiating or scheduling a voice or video call may include determining whether the currently attempted call or the scheduled call are adverse to one or more restrictions (e.g., inmate use restrictions, device use restrictions, and/or inmate target restrictions). Further, the inmate kiosk (208) may also include the functionality to exchange media (e.g., photos, videos, and audio) with a visitor or outsider. The inmate kiosk (208) may include functionality to generate such media, such as a camera, microphone, keyboard, and software to record or otherwise create media to send to a visitor or outsider. Such media may be subject to review before being delivered.

In one or more embodiments of the invention, an inmate wanting to use an inmate kiosk (208) may be required to participate in an authentication process to verify the identity of the inmate. The authentication process may include providing verification data for comparison to verified data previously obtained from the inmate and stored in the inmate identity data item. The verified data may be a username and password combination and/or biometric information about the inmate.

In one or more embodiments of the invention, the inmate kiosk (208) includes functionality to access a secure social network. Specifically, the inmate kiosk (208) may be used by an inmate to manage a secure social network account. The inmate kiosk (208) may include functionality to generate such media, such as a camera, microphone, keyboard, and software to record or otherwise create media to send to a visitor or outsider. The inmate kiosk (208) may also be used by an inmate to upload digital media to the inmate's secure social network account or the account of another secure social network member. The inmate kiosk (208) may further be used to view digital media uploaded to the inmate's social network account or the account of another secure social network member. Uploaded media may be subject to review before posting.

In one or more embodiments of the invention, the inmate kiosk (208) includes functionality to manage a commissary account for the inmate. Specifically, an inmate may use an inmate kiosk (208) to view a transaction history of the commissary account and/or to apply commissary funds for goods and services consumed or enjoyed by the inmate. Further detail about the inmate kiosk (208) is provided in FIG. 5A and FIG. 5B.

In one or more embodiments of the invention, the inmate phone (210) is a device with functionality to send and receive audio communications between an inmate and an outsider or visitor. The inmate phone (210) may be implemented as handset connected to a telephone line. In one or more embodiments of the invention, all or part of the voice call may be conducted over a VoIP connection. In one or more embodiments of the invention, a single inmate phone (210) is utilized by multiple inmates.

In one or more embodiments of the invention, initiating or receiving a voice call using the inmate phone (210) requires a form of authentication (e.g., providing a password, personal identification number, or voice verification). In one or more embodiments of the invention, voice calls made using the inmate phone (210) are monitored by one or more administrators using the administrator computing device (206), and are recorded and stored in a data storage system within the controlled facility (200), within the outside facility (not shown), or within a third party provider (not shown). The inmate phone (210) may also be subject to device use restrictions limiting the ability to use the inmate phone (210) at certain times (e.g., between 9 PM and 8 AM) or under certain conditions (e.g., emergency lockdown).

In one or more embodiments of the invention, the identity of the visitor or outsider targeted by the inmate or attempting to contact the inmate using the inmate phone (210) is verified against inmate target restrictions imposed on the inmate. Such restrictions may be associated with the inmate's identity data item and may be stored locally within the controlled facility (200), within the outside facility (not shown), or within a third party provider (not shown). The visitor or outsider identity may be verified by the local server (214) or by another server within the outside facility (not shown), or within a third party provider (not shown).

In one or more embodiments of the invention, the inmate computing device (212) is a computing system configured to execute the inmate application (202). In one or more embodiments of the invention, each inmate computing device (212) is utilized exclusively by a single inmate. In one or more embodiments of the invention, access to the inmate application requires a form of initial authentication. This initial authentication may use verification data stored locally on the inmate computing device (212) (e.g., a code or combination used to unlock the phone, locally stored biometric data, etc.).

In one or more embodiments of the invention, accessing a communications network (e.g., communications network (216)) using the inmate application (220) may require further network-based authentication. This further authentication may use verification data stored external to the inmate computing device (212) but locally within the controlled facility (200), or remotely within the outside facility (not shown) or within a third party provider (not shown).

In one or more embodiments of the invention, an authenticated inmate may use the inmate application to initiate or receive voice or video calls, initiate or receive text or media messages, schedule a voice or video call, manage a commissary account, or post media to a secure social network. In one or more embodiments of the invention, voice and video calls made using the inmate computing device (212) are monitored by one or more administrators using the administrator computing device (206), and are recorded and stored in a data storage system within the controlled facility (200), within the outside facility (not shown), or within a third party provider (not shown).

In one or more embodiments of the invention, the identity of the visitor or outsider targeted by the inmate or attempting to contact the inmate using the inmate computing device (212) is verified against inflate target restrictions imposed on the inmate. Such restrictions may be associated with the inmate's identity data item and may be stored locally within the controlled facility (200), within the outside facility (not shown), or within a third party provider (not shown). The visitor or outsider identity may be verified by the local server (214) or by another server within the outside facility (not shown), or within a third party provider (not shown).

In one or more embodiments of the invention, the inmate computing system (212) and/or the inmate application (220) may limit access to the communications network (216) based on one or more restrictions (inmate use restrictions, inmate target restrictions, and device use restrictions). Further, the inmate computing system (212) and/or the inmate application (220) may gather data from input devices of the inmate computing system (212) to determine whether one or more restrictions apply. Such input devices may include, for example, a system clock, a global positioning system antenna, a wide area network antenna, etc.

In one or more embodiments of the invention, the local server (214) is a computer system or group of computers systems located within the controlled facility (200) that facility communication between inmates and visitors, outsiders, and/or other inmates. Specifically, the local server (214) may implement the software necessary to host voice and video calls between and among the visitor kiosk (202), the inmate kiosk (208), the inmate phone (210), and an outsider computing system (not shown). The local server (214) may also include functionality to enforce communication restrictions associated with the initiates using the inmate kiosk (208) or inmate phone (210). Alternatively, the local server (214) may merely provide access to other systems capable of hosting the communication software and data storage (e.g., located within an offsite facility or a third party provider). Further, in one or more embodiments of the invention, the local server (214) includes functionality to regulate inmate access to a secure social network.

Figure 3:
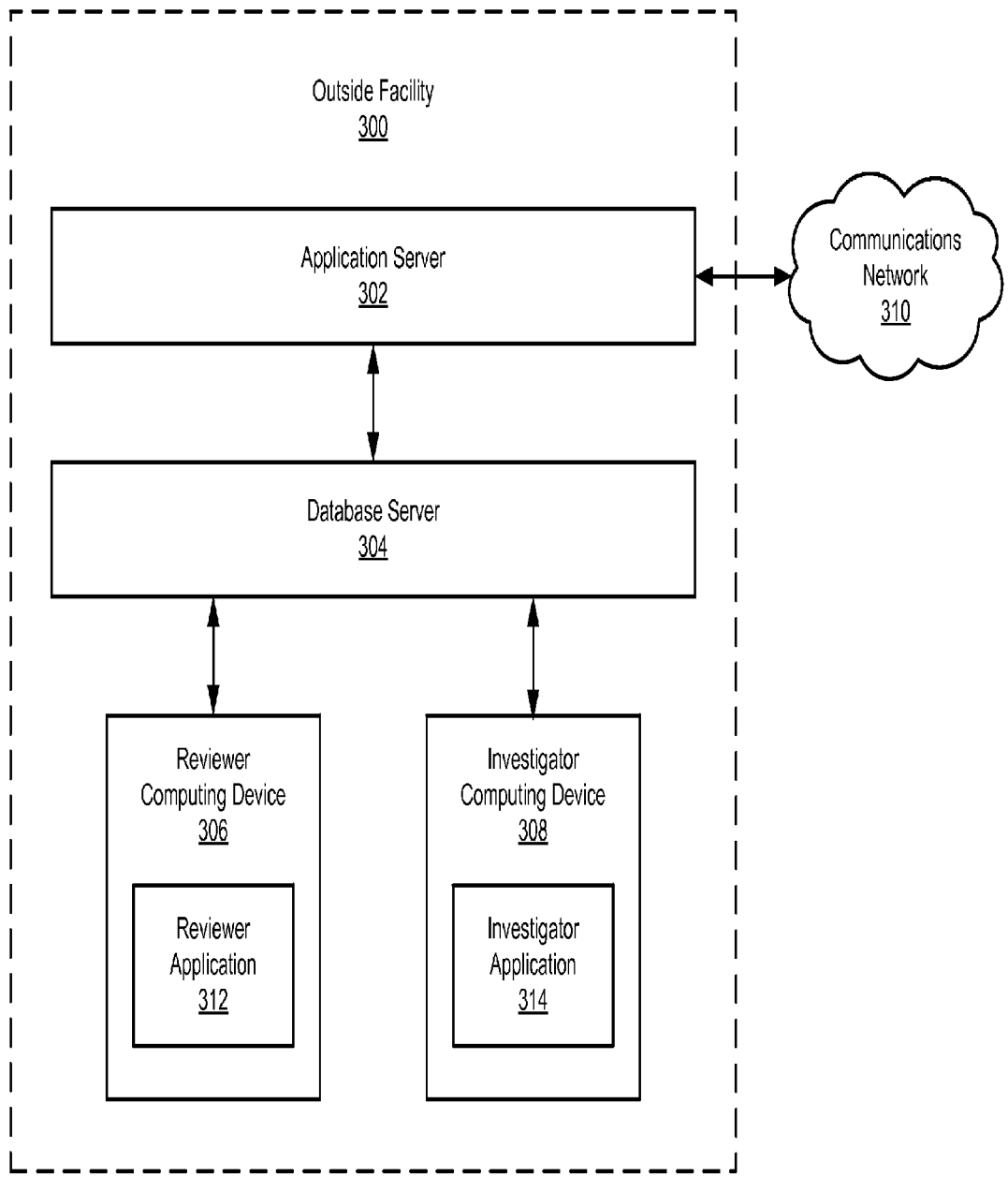

FIG. 3 shows an outside facility in accordance with one or more embodiments of the invention. As shown in FIG. 3, the outside facility (300) may include an application server (302), a database server (304), a reviewer computing system (306), and an investigator computing system (308). The application server (302) is communicatively coupled to the communications network (310). The reviewer computing device (306) may include a reviewer application (312), and the investigator computing device (308) may include an investigator application (314).

In one or more embodiments of the invention, the application server (302) is a computing system or group of computing systems configured to authenticate inmates, visitors, outsiders, administrators, reviewers, and/or investigators. Specifically, the application server (302) includes functionality to receive a request to authenticate an inmate, visitor, outsider, administrator, reviewer, and/or an investigator, retrieve verified data associated with the request, and compare the verified data to verification data submitted in the authentication request. In one or more embodiments of the invention, the application server provides access to identity data items and other data stored in the database server (304).

In one or more embodiments of the invention, the database server (304) is a computing system or group of computing system configured to store data about inmates, visitors, outsiders, administrators, reviewers, and/or investigators as well as communication data describing communications between and among inmates, visitors, outsiders, administrators, reviewers, and/or investigators. Data stored in the database server may include, but is not limited to, identity data items, verified data, approved communication media, communication media pending review In one or more embodiments of the invention, the reviewer computing device (306) is a computing system configured to execute the reviewer application (312). In one or more embodiments of the invention, a reviewer is a person charged with viewing a media item submitted by an inmate, visitor, outsider or administrator, and determining one or more attributes of the media item. Based on the determined attributes of the media item, the reviewer may then approve the media item for transmission to its target inmate, visitor, or outsider. Alternatively, the reviewer may reject the media item, conditionally approve the media item, or redact parts of the media item, thus preventing complete transmission to its target inmate, visitor, or outsider. In one or more embodiments of the invention, the reviewer application (312) include functionality to view media items, associate one or more attributes to the media item, and/or mark the media items as approved or rejected.

In one or more embodiments of the invention, the investigator computing device (308) is a computing system configured to execute the investigator application (314). In one or more embodiments of the invention, an investigator is a person gathering information about an inmate, visitor, or outsider generally for the purposes of law enforcement. The investigator application (314) includes functionality to provide access to data stored on the database server (304) for investigative purposes.

Figure 4:
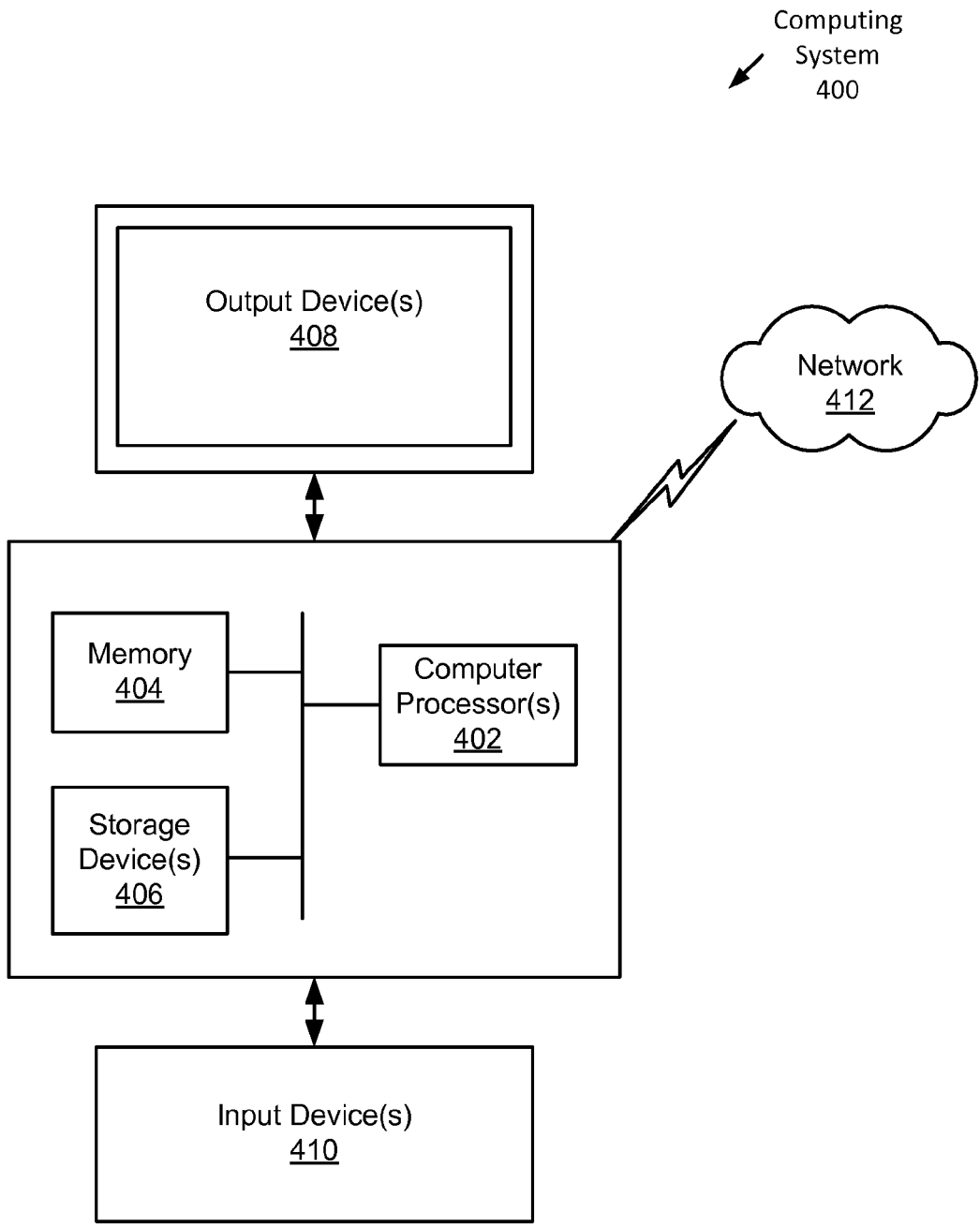

FIG. 4 shows a general computing system in accordance with one or more embodiments of the invention. As shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, camera, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (414) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (414). Further, embodiments of the invention may be implemented on a distributed system having a plurality of nodes, where each portion of the invention may be located on a different node within the distributed system. In one or more embodiments of the invention, the node corresponds to a distinct computing device. Alternatively, the node may correspond to a computer processor with associated physical memory. The node may alternatively correspond to a computer processor or micro-core of a computer processor with shared memory and/or resources.

Figure 5A:
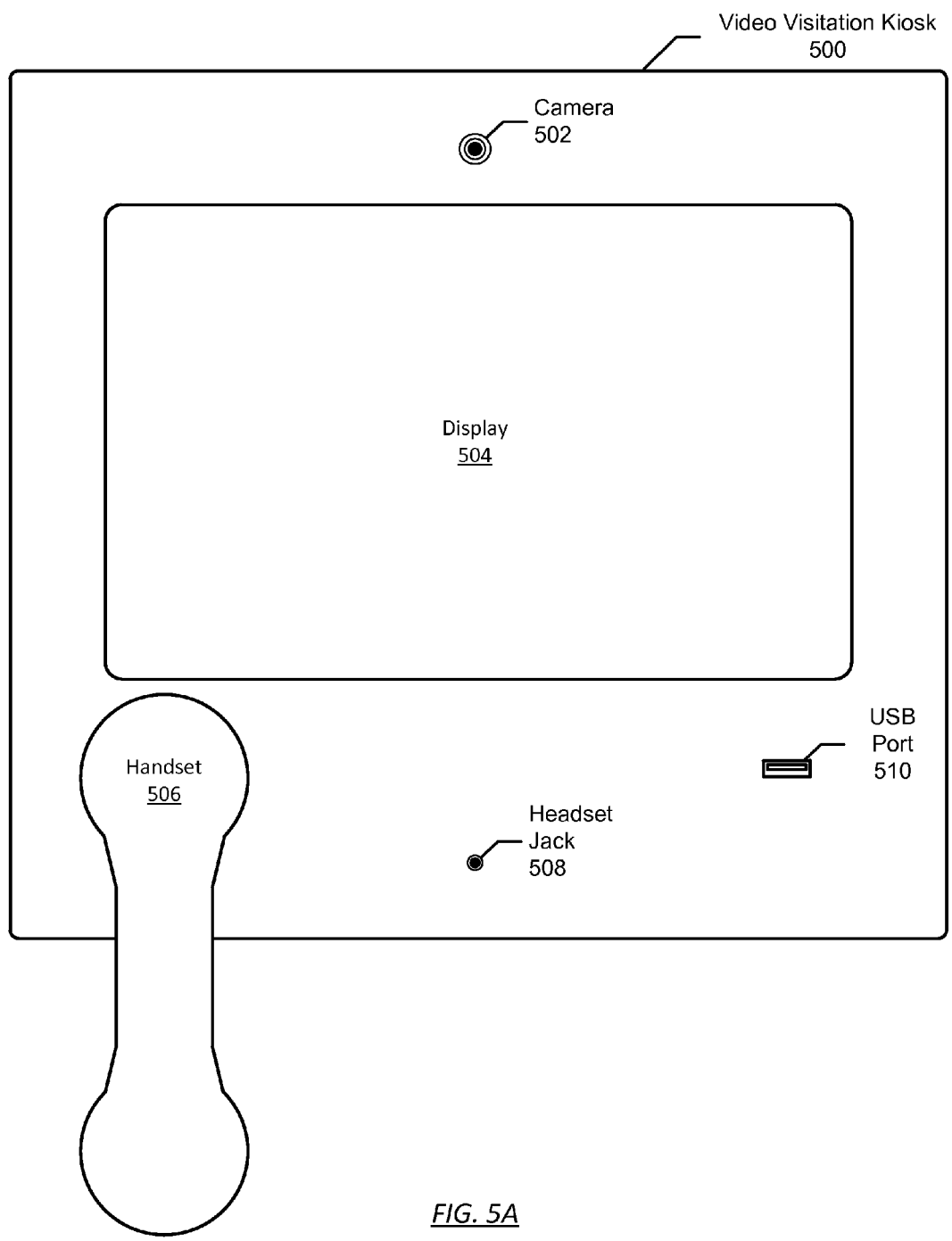

FIG. 5A shows a video visitation kiosk in accordance with one or more embodiments of the invention. Specifically, the video visitation kiosk (500) is a type of computing device as described in FIG. 4. As shown in FIG. 5A, the video visitation kiosk (500) includes a camera (502), a display (504), a handset (506), a headset jack (508), and a universal serial bus (USB) port (510).

Figure 5B:
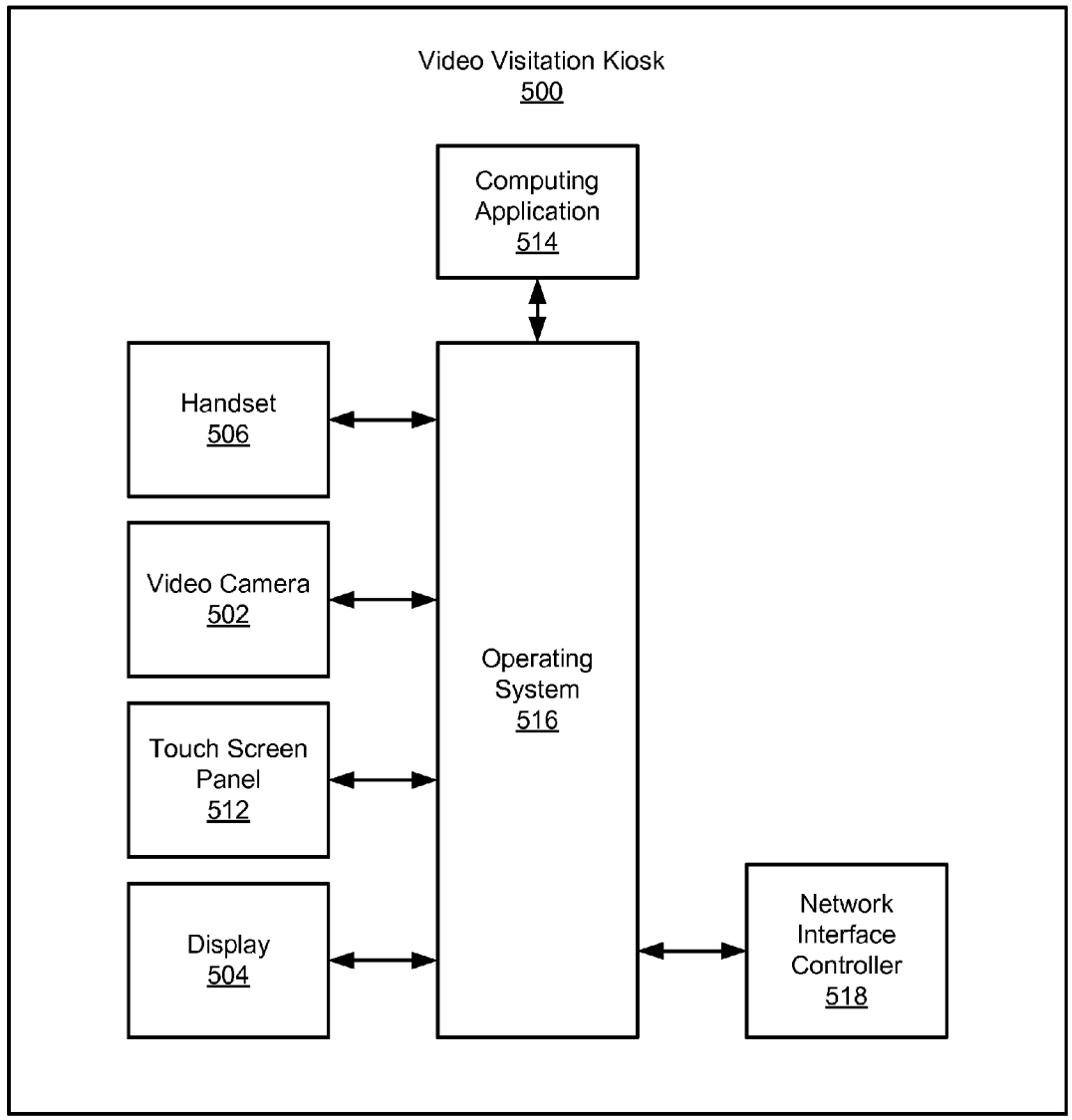

FIG. 5B shows the hardware and software elements of a video visitation kiosk in accordance with one or more embodiments of the invention. The hardware and software elements shown in FIG. 5B may be in addition to the elements described in FIG. 4. As shown in FIG. 5B, the video visitation kiosk (500) includes a handset (506), a video camera (502), a touch screen panel (512), a display (504), a computing application (514), an operating system (516), and a network interface controller (518).

Figure 6:
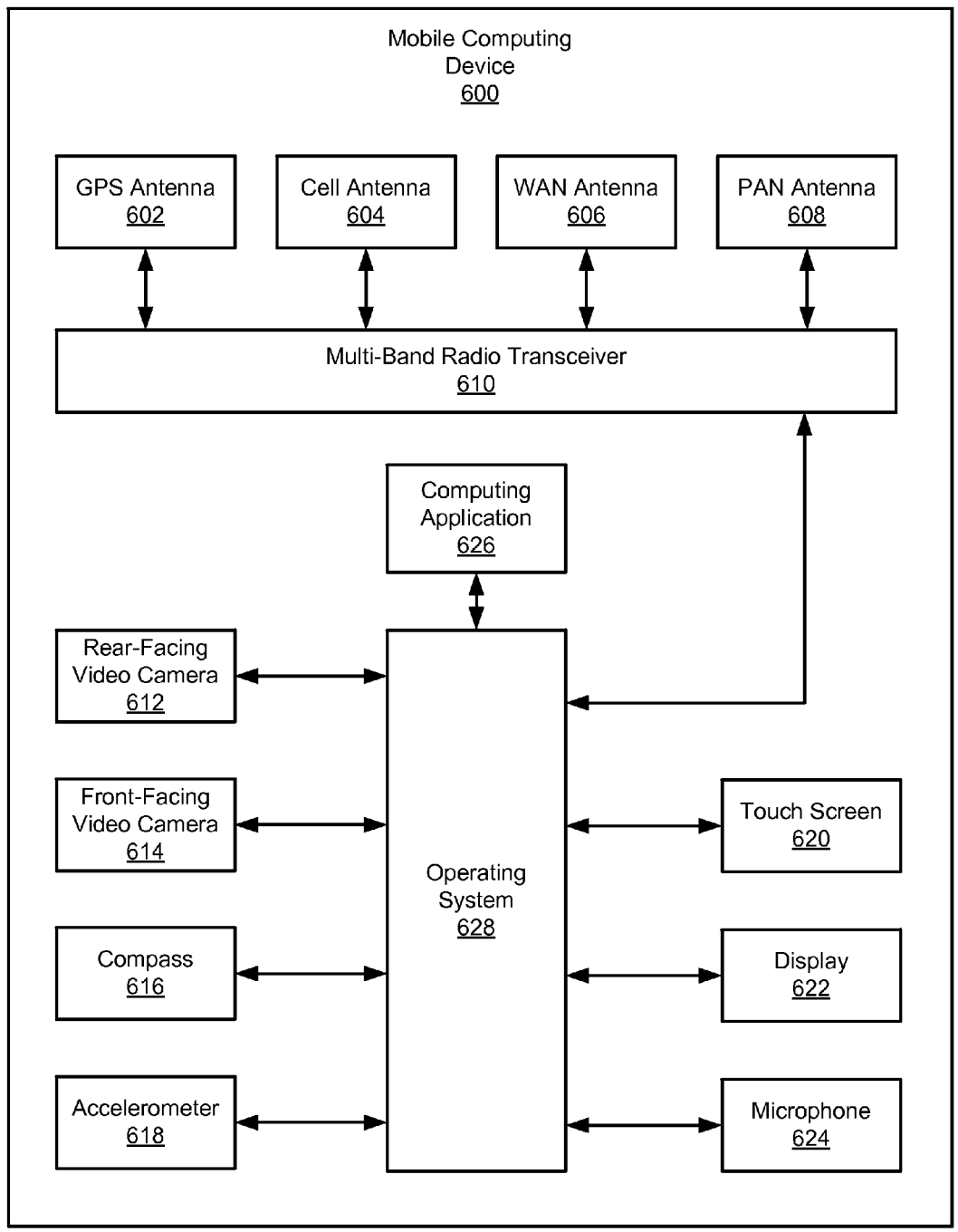

FIG. 6 shows the hardware and software elements of a mobile computing device in accordance with one or more embodiments of the invention. Specifically, the mobile computing device (600) is a type of computing device as described in FIG. 4. The hardware and software elements shown in FIG. 6 may be in addition to the elements described in FIG. 4.

As shown in FIG. 6, the mobile computing device (600) may include a global positioning system (GPS) antenna (602), a cell antenna (604), a wide area network (WAN) antenna (606), and a personal area network (PAN) antenna (608), each connected to a multi-band radio transceiver (610). The mobile computing device (600) also may include a rear-facing video camera (612), a front-facing video camera (614), a compass (616), an accelerometer (618), a touch screen (620), a display (622), and a microphone (624). The mobile computing device (600) also may include a computing application (626) executing on an operating system (628).

Figure 7:
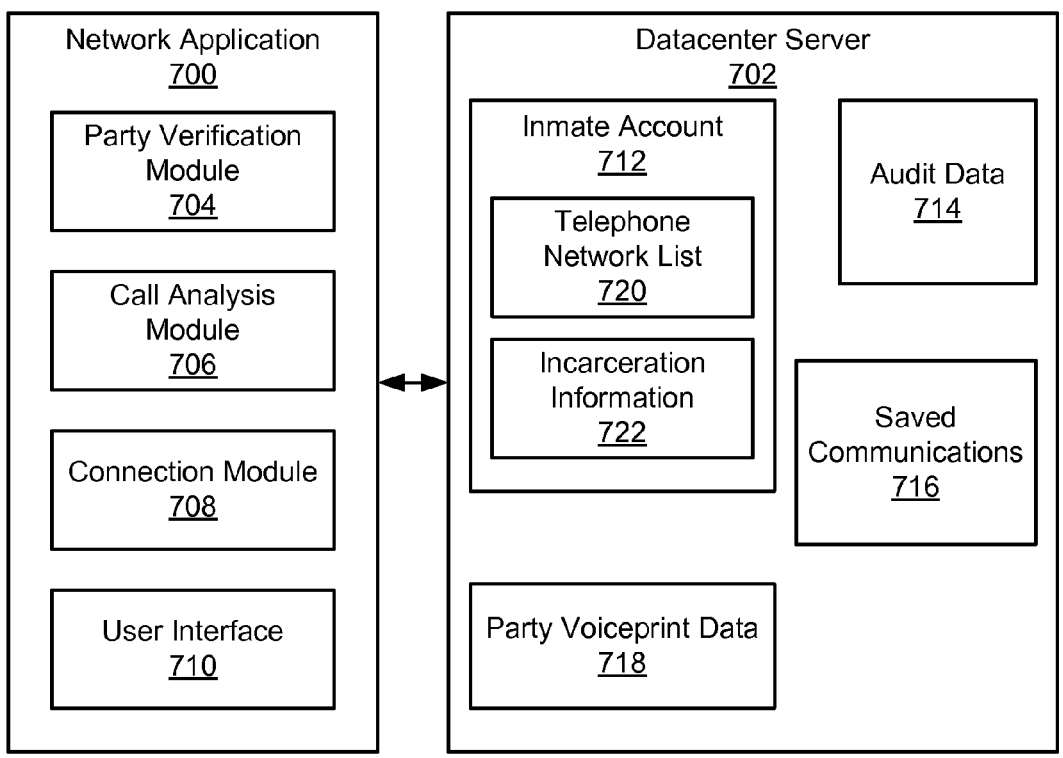

FIG. 7 shows a schematic diagram of a system including a network application (700) and a database server (702). The network application (700) may execute or be a part of application server (118) in FIG. 1. Similarly, the database server may be database server (120) in FIG. 1. Alternative configurations may also be used. For example, either, both, or part of the network application (700) and database server (702) may be located in the controlled facility. The network application (700) and database server (702) are discussed below.

In one or more embodiments of the invention, a network application (700) is a software application for connecting inmates and administrators to a network. For example, the network may be a telephone network (not shown) or a secure social network (not shown). The network application (700) may include a party verification module (704), a call analysis module (706), a connection module (708), and a user interface (710). Each of these components is discussed below.

In one or more embodiments of the invention, the party verification module (704) includes functionality to verify parties to a multiparty call. Specifically, the party verification module (704) includes functionality to verify that the inmate is authorized to call the numbers called in the multiparty call, to confirm the identity of parties on the call, and to verify that parties on the call are authorized. In one or more embodiments of the invention, the party verification module (704) includes functionality to perform a voiceprint analysis of parties on the call.

In one or more embodiments of the invention, the call analysis module (706) includes functionality to analyze the multiparty call. Specifically, the call analysis module (706) includes functionality to analyze the discussion of the call for inappropriate content, determine whether a crime is being discussed, compare call fingerprints, and perform other such acts. The call analysis module (706) may include a tone detector (not shown). A tone detector includes functionality to detect when a call has a tone from a controlled facility. Thus, for example, the tone detector may detect inmates in different controlled facilities talking even when one of the inmates calls the other inmate through an intermediary. In one or more embodiments of the invention, each tone is unique to a controlled facility. Specifically, each controlled facility may have a distinct and unique tone in one or more embodiments of the invention. Alternatively, the tone may be identical for each controlled facility. In one or more embodiments of the invention, the call analysis module (706) may include functionality to perform data mining on connection parameters of the call. For example, the connection parameters may include an inmate identifier of an inmate making the call, the phone numbers called, the time of day of the call, and other parameters of a call.

The connection module (708) includes functionality to connect the inmate to a multiparty call. Specifically, the connection module (708) includes functionality to receive a request for a multiparty call and implementing the multiparty call. The connection module (708) may include a tone generator (not shown) that includes functionality to generate a controlled facility tone. In one or more embodiments of the invention, the connection module (708) may include functionality to generate a fingerprint for the call. A fingerprint is a unique identifier of the call. For example, the fingerprint may be the first, middle, or last couple of seconds of a call.

In one or more embodiments of the invention, a user interface (710) includes functionality to interface with an investigator or administrator. For an administrator or reviewer on the call, the user interface includes keypad, voice or other buttons to control the audio on the call, individually controlling the audio of one or more parties the call, reducing background noise or performing other actions. Further, in one or more embodiments of the invention, the user interface (710) may include functionality to display a pictures of the parties to the call, a picture of the party currently talking in the call, present call parameters (e.g., statistics). In one or more embodiments of the invention, the user interface (710) may include functionality to display a social networking profile of each party on the call, display details about an inmate's incarceration (e.g., booking date, charges, convictions, gang affiliations, disciplinary actions). The user interface (710) may include functionality to display familial and gang affiliations visually, with differently colored or dashed (or otherwise visually distinguished) lines connecting members of each affiliation.

Although not shown in FIG. 7, the network application (700) may include an authentication module. In one or more embodiments of the invention, an authentication module includes functionality to authenticate individuals to the desired network. For example, the authentication module may include functionality to receive authentication credentials, and determine whether the authentication credentials match stored credentials for the individual. The authentication credentials may be user name, password, voiceprint authentication, face verification information, identifying body marks and features information, retina verification information, palm or fingerprint verification information, or any other type of credential for authentication.

Continuing with FIG. 7, the network application (700) is operatively connected to the database server (702). The database server (702) includes functionality to store information for the network application (700). For example, the database server (702) may store an inmate account (712) for each inmate, party voiceprint data (718), audit data (714), and saved communications (716). Each of the stored data is discussed below.

Continuing with the database server (702), an inmate account (712) is an account storing information about an inmate. For example, an inmate account (712) may include a telephone connection list (720) and incarceration information (722). Additionally, although not shown in FIG. 7, the inmate account may also include administrative information, such as name, birthdate, inmate identifier, and other information. Additionally or alternatively, the inmate account (712) may include authentication credentials (not shown) for the inmate to authenticate him or herself to the network application (700).

The telephone network list (720) corresponds to a list of contacts of the inmate for communication via the telephone network. In one or more embodiments of the invention, before being allowed to communicate with the contacts, the contacts must be approved. Further, although an inmate may communicate with contacts in the inmate telephone network list and the inmate secure social network list, the contacts may not be approved in accordance with one or more embodiments of the invention. Specifically, the inmate telephone network list and the inmate secure social network list may include unprocessed contacts, filtered contacts, and/or approved contacts.

An unprocessed contact is a contact that has not been vetted or checked to determine whether communication with the unprocessed contact is prohibited. A filtered contact is a contact that is not outright prohibited for communication. An approved contact is a contact that has been vetted and with whom the inmate may communicate. For example, unprocessed contacts may be filtered to remove contacts that are known gang members, are inmates, are wanted criminals, or have other attributes, which make communication with such contacts outright prohibited. In one or more embodiments of the invention, the filtering process may include comparing the contact with lists of prohibited people. In some embodiments, the remaining contacts after the filtering processed are approved contacts. In alternative embodiments, filtered contacts may have to be vetted (e.g., go through an identification and/or approval process) to be approved contacts. The vetting may include performing background checks on the contact and confirming the identity of the contact. In one or more embodiments of the invention, rules of the controlled facility define whether filtered contacts must be vetted in order for the inmate to communicate with the approved contacts. Whether a contact is an unprocessed contact, filtered contact, or approved contact may be maintained as an attribute defined for the contact in the inmate account.

In one or more embodiments of the invention, the incarceration information (722) corresponds to information about an inmate's incarceration. For example, incarceration information may include booking date, charges, convictions, gang affiliations, disciplinary actions, historical confinement of the inmate, list of inmate's violations of regulations of the controlled facility, account balance fix payment of communications, and other information.

Continuing with the discussion regarding the database server (702), the audit data (714) includes information stored for auditing purposes. For example, for each communication, the audit data may include timestamps defining when the third party call was performed, detected individuals on the call, telephone numbers on the call, length of the call, a unique identifier of the communication device used in the call, and other tracking information about the call. Saved communications (716) correspond to transcripts and/or recordings of the multiparty call.

In one or more embodiments of the invention, party voiceprint data (718) corresponds to known voiceprints related to the individual having the voiceprint. For example, voiceprint data (718) may include voiceprints for present and past inmates of the controlled facility and other controlled facilities, voiceprints of judges and prosecutors, and other information.

Although FIG. 7 shows a certain configuration of components, other configurations may be used without departing from the scope of the invention.

Figure 8:
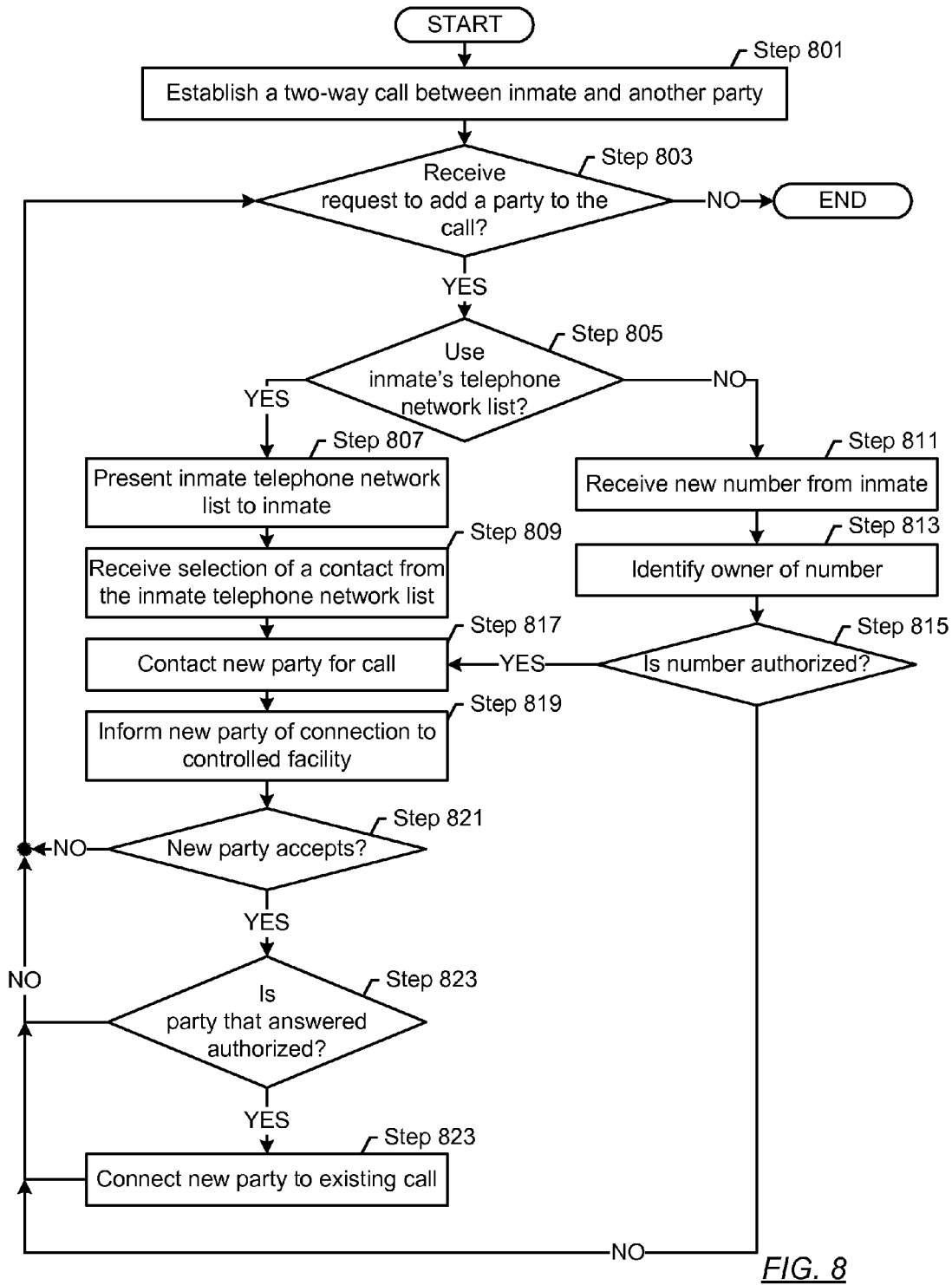
FIGS. 8-11 show flowcharts of a method in one or more embodiments of the invention.
Figures 9, 10:
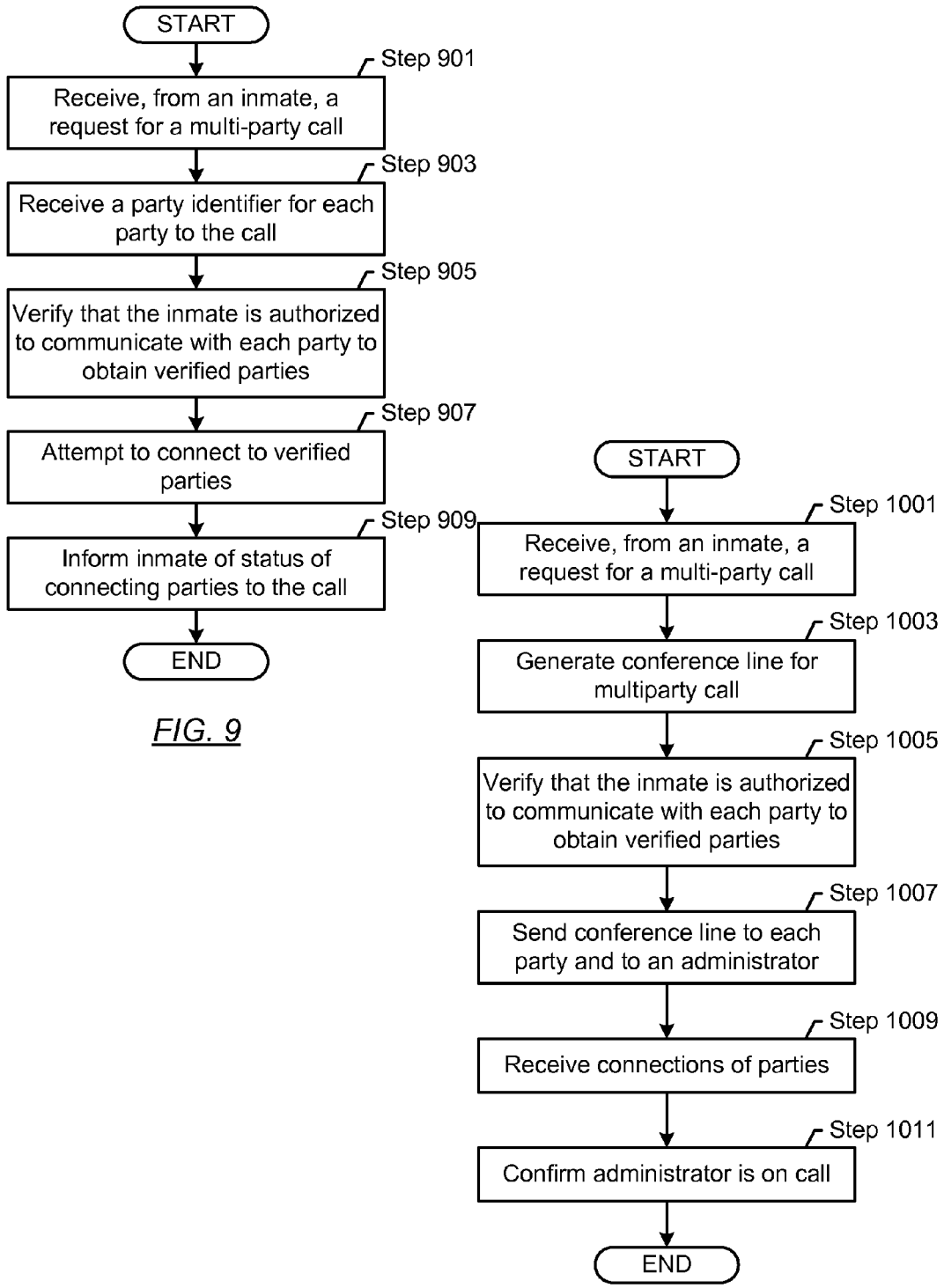

FIGS. 8-10 show flowcharts in one or more embodiments of the invention. While the various steps in these flowcharts are presented and described sequentially, some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 8 shows a flowchart for creating a multiparty call by adding parties to an existing call in one or more embodiments of the invention. In Step 801, a two-way call is established between an inmate and another party in accordance with one or more embodiments of the invention. For example, the inmate may authenticate him or herself to the network application. The inmate may receive the call or place the call in one or more embodiments of the invention.

In one or more embodiments of the invention, a determination is made whether a request is received to add a party to the call in Step 803. Specifically, the inmate may indicate a request to add a party to a call during the call. For example, the inmate may flash the switch hook (e.g., by depressing the switch hook for a predefined period of time). The connection module may detect the flashing of the switch hook and temporarily suspend the call. The connection module may prompt the inmate with instructions for adding another party to the call.

In Step 805, a determination is made whether to use the inmate's telephone network list in one or more embodiments of the invention. For example, the inmate may select to communicate with an existing contact. In one or more embodiments, an inmate telephone network list is presented to the inmate in Step 807. For example, if the inmate is performing the call through an inmate kiosk, the inmate telephone network list is displayed for the inmate. By way of another example, if the call is through an inmate telephone, the inmate telephone list may be audibly played for the inmate. The connection module may optionally use caller ID, or reverse-number lookup databases to assign a name to each number, and then use text-to-speech conversion to read the name of each number to the inmate in one or more embodiments of the invention. As an alternate example, the inmate may simply press the star button to temporarily suspend the call and cause the connection module to prompt with instructions to add another party to the call.

In Step 809, a selection of a contact is received from the inmate telephone network list in accordance with one or more embodiments of the invention. For example, the inmate may dial as short speed dial code that is one digit in the range of 2-9, or two digits in the range of 20-49. By way of another example, if the inmate is using a kiosk, the inmate may select a button corresponding to the contact. Although not shown in FIG. 8, when the selection is received, a determination may be made whether the contact is unprocessed, filtered, or approved in one or more embodiments of the invention. If the contact is unprocessed, in some embodiments, the contact may be filtered and, if the contact is not prohibited, then the contact is approved. In some embodiments, a contact may need to be additionally vetted to be approved. In one or more embodiments of the invention, once a contact is approved, information about the approval may be stored in the data-center server and the contact does not need to be reapproved for subsequent communication.

Returning to Step 805, if the determination is made not to use the inmate's telephone network list, then a new number is received from the inmate in Step 811. In Step 813, the owner of the number is identified. Determining the owner may be performed by performing a reverse phone number lookup search to identify the owner. If the owner cannot be identified from a reverse phone number lookup, the addition of the new party may be denied in one or more embodiments of the invention.

In Step 815, if the owner is identified, a determination is made whether the number is authorized in accordance with one or more embodiments of the invention. For example, a determination may be made as to whether the inmate may connect to the owner. Determining whether the inmate may be performed by comparing the owner to an unauthorized list, such as known gang members, judges, jury, prosecutor, witnesses, victims, or other individuals. If the number is not authorized, then the inmate may be notified of the lack of authorization and prohibited from completing adding the new party.

In Step 817, if the number is authorized, the new party is contacted for the call in accordance with one or more embodiments of the invention. Specifically, the number may be dialed or otherwise connected.

In Step 819, the new party is informed of the call being a call with a controlled facility. Specifically, the new party may be performed prior to the inmate being able to communicate with the new party. The information may include, for example, that the call is subject to monitoring and recording. Further, the connection module may ask the party to accept or reject the call (e.g., by using a touch-tone keypad). In Step 821, a determination, is made whether the new party accepts. If the new party does not accept, then the party is not added to the call.

In Step 823, if the party accepts, then a determination is made whether the party that answered is authorized in accordance with one or more embodiments of the invention. For example, the party that answered may not be the owner of the telephone number to the call. In such a scenario, embodiments may request the party's name or use voiceprint technology to determine whether the party is authorized. Further, determining whether the party is authorized may be performed by determining whether or not the party is prohibited. Specifically, one or more embodiments may use a prohibited list and allow parties who are not on the list. Alternatively or additionally, one or more embodiments may used an allowed list and deny parties not on the list.

If the party that answered is not authorized, then the party may not be added to the multiparty call. If the party is authorized, the new party is connected to the existing call in Step 823 in one or more embodiments of the invention. In one or more embodiments of the invention, the inmate may optionally continue adding parties to the call.

FIG. 9 shows a flowchart for establishing a multiparty call in one or more embodiments of the invention. Specifically, FIG. 9 shows a flowchart for an inmate to specify at the beginning that a call is to be a multiparty call in accordance with one or more embodiments of the invention.

In Step 901, a request for a multiparty call is received from an inmate in accordance with one or more embodiments of the invention. For example, the inmate may access the network application, authenticate him or herself to the network application, and select a menu option to create a multiparty call.

In Step 903, a party identifier is received for each party to the call in accordance with one or more embodiments of the invention. Specifically, the inmate may specify each party to the call. Receiving a party identifier may be performed in the same or similar manner to performing Steps 807, 809, and 811 of FIG. 8 as described above.

In Step 905, verification that the inmate is authorized to communicate with each party to the call is performed to obtain verified parties. In one or more embodiments of the invention, each party is verified independently. If a party is unauthorized, then multiparty call may proceed without the party. Alternatively, the inmate may be notified that a particular party is not permitted to join and the inmate may decide whether to proceed without the party. Verifying parties to the call may be performed in the same or similar manner to performing Steps 813, 815 and 823 of FIG. 8 as described above.

In Step 907, an attempt is made to connect to verified parties in accordance with one or more embodiments of the invention. In particular, the number of the party may be dialed. If the party does not answer or does not accept, the call with the party fails. Steps 905 and 907 may be performed in parallel. For example, a first verification may be performed based on the owner of the telephone number and a second verification may be performed based on the party that answered the telephone number.

In Step 909, an inmate is informed of the status of connecting parties to the call in accordance with one or more embodiments of the invention. In one or more embodiments of the invention, the inmate may be informed as to how the call is proceeding. For example, while the parties are connected, authentication, and authorization checks are being performed, the inmate may be kept apprised of the status, and optionally be presented with music-on-hold to keep him or her comfortable. In the example, as each party is confirmed, the network application may announce the success of the connection, state the party's name (e.g., by their recorded name or by text-to-speech), and then connect the call. Further in the example, upon denial of any party or failure of the party to answer, the network application may announce the failure. In the example, upon having authorized or denied all desired parties, the network application may announce that all available and permitted parties are connected. The network application may then remain virtually silent for either the rest of the call, or until the inmate initiates a touch-tone command to perform such tasks as removing parties from the call, or performing other operations.

FIG. 10 shows another flowchart for establishing a multiparty call in accordance with one or more embodiments of the invention. In FIG. 10, a conference line is used. In Step 1001, a request from an inmate for a multiparty call is received in accordance with one or more embodiments of the invention. Receiving a request may be performed in the same or similar manner to Step 901 in FIG. 9 discussed above.

In Step 1003, a conference line for a multiparty call is generated in accordance with one or more embodiments of the invention. Specifically, a number is selected for all parties to call in. The number may be a toll number, such that each party pays for part of the call in accordance with one or more embodiments of the invention. Alternatively, a toll-free number or local number may be used.

In Step 1005, a verification that the inmate is authorized to communicate with each party to the multiparty call is performed to obtain verified parties. Verifying parties may be performed in the same or similar manner to Step 905 in FIG. 9 discussed above.

In Step 1007, the conference line is sent to each party and to an administrator in accordance with one or more embodiments of the invention. For example, the conference line may be emailed to each party. By way of another example, each party may receive a text or voice message with the conference line. In one or more embodiments of the invention, the administrator added to the call may serve as a moderator on the call. For example, the administrator may listen to the subject matter of the call and control the audio of the call.

In Step 1009, connections of the parties are received. Specifically, each party calls in to the conference line. In Step 1011, the administrator on the call is confirmed. In one or more embodiments of the invention, the inmate may be prohibited from communicating in a multiparty call until an administrator is on the call. Thus, the administrator's presence may be verified before the call proceeds. Once the administrator's presence is verified, the call may proceed.

Figure 11:
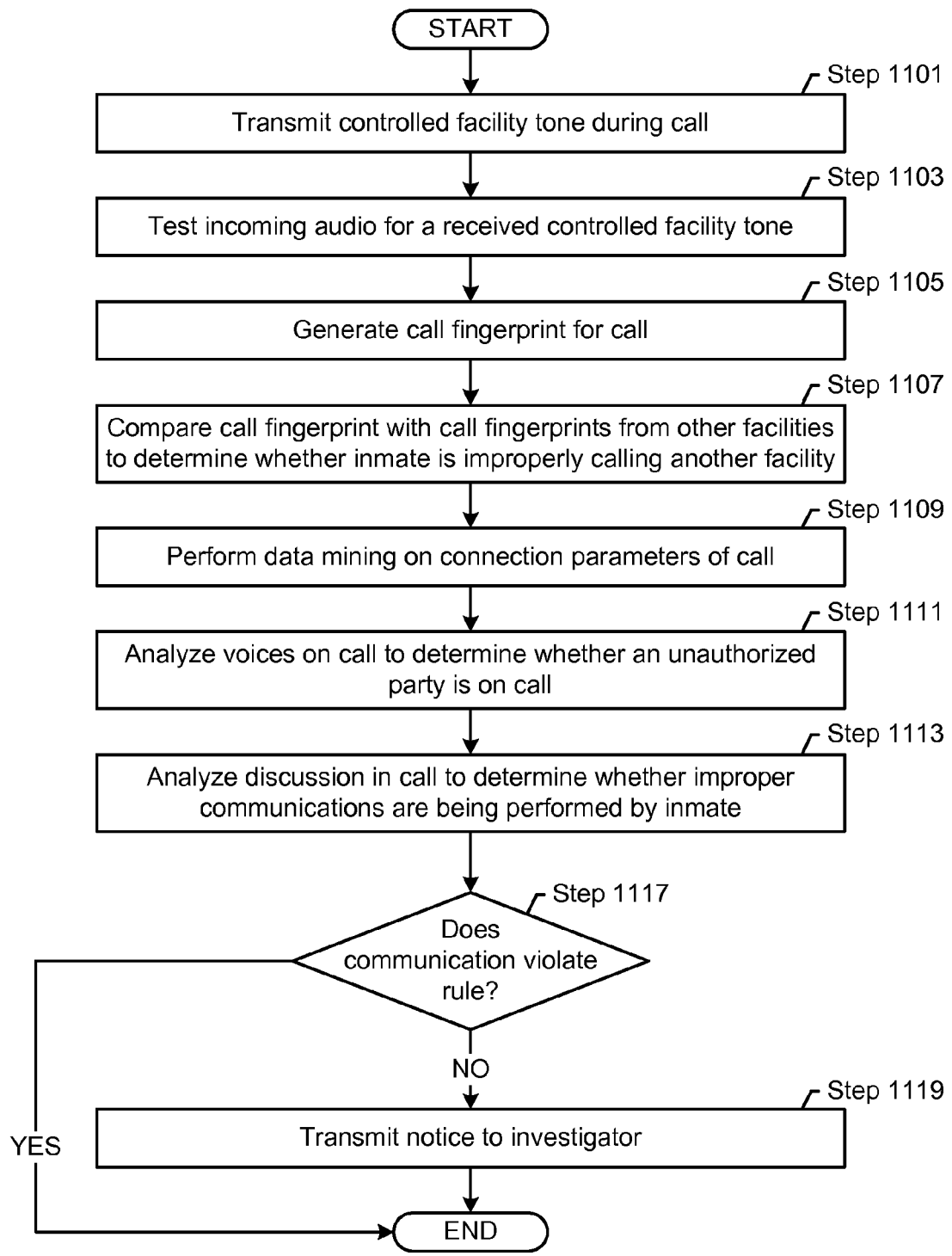

FIG. 11 shows a flowchart for controlling and analyzing a call in accordance with one or more embodiments of the invention. In Step 1101, a controlled facility tone is transmitted during the call in accordance with one or more embodiments of the invention. Various techniques of tone generation and detection may be used. The various techniques may be coordinated amongst all or a portion of the controlled facility using tonal generation and detection.

For example, in a first technique, multiple notch filters are used in a coded pattern, unique to each controlled facility, terminal, inmate, or other in accordance with one or more embodiments of the invention. To identify incoming calls from a controlled facility, the multiple notches may be removed from incoming audio generated originating from controlled facilities to obtain identifying patterns. Details about each pattern may be stored in a data repository that is indirectly or directly available to controlled facilities. Thus, the identifying pattern in incoming audio may be detected and compared with stored patterns in the data repository. In one or more embodiments of the invention, tones are selected so as to not result in destructive interference when incoming audio is from multiple controlled facilities. In such a scenario, pattern matching may be used to distinguish each tone.

By way of another example technique, a continuous and scarcely audible set of tones are generated, with pre-defined patterns for each facility. For example, such tones may be at each edge of the telephony band pass filters. In such a scenario, because of constructive and/or destructive interference effects, the audio on the channel (e.g., incoming audio and outgoing audio) is changed when more than one similar tone is present.

In one or more embodiments, the tone may include information about the call, such as the vendor who added the tone to an inmate call, a unique identifying number identifying the stored communication in the datacenter server, an identifier of the inmate, a location of the phone or kiosk, an original dialed number, and/or other information In Step 1103, incoming audio is tested for a controlled facility tone in accordance with one or more embodiments of the invention. Testing the incoming audio may be dependent on the technique as discussed above. If incoming audio is positive for a controlled facility tone, then the system may detect that at least the same or different controlled facility is also on the line. For example, two inmates in the same controlled facility may be attempting to communicate via a third party. Alternatively, inmates in different controlled facilities may be attempting to communicate via a third party. In such a scenario, the communication may be a violation of a rule of the controlled facility.

Although not presented in FIG. 11, outsiders or investigators may use the controlled facility tone to detect when a call includes an inmate in a controlled facility. For example, the inmate may attempt to bypass detection by making the call through a third party, who then conference calls the outsider. However, the call, which is now a multiparty call, includes the tone from the controlled facility. By comparing the tone with stored tones, the outsider may detect that the inmate is present. Thus, one or more embodiments may prevent the inmate from calling outsiders, such as judges, jury members, witnesses, victims, and others.

In Step 1105, a call fingerprint is generated for the call in accordance with one or more embodiments of the invention. Generating a call fingerprint may be performed by storing a short segment of the call separate and distinct from the stored communication. The short segment may be, for example, a five second segment, a twenty second segment, a thirty second segment, etc. Further, multiple segments may be grouped to create the fingerprint. For example, segments gathered from the beginning and middle of each minute may be grouped to create a call fingerprint.

In Step 1107, the call fingerprint is compared with call fingerprints from other facilities to determine whether inmate is improperly calling another facility. In order to reduce the number of comparisons, the call fingerprint may be compared with call fingerprints generated from calls in the same time range as the original call. For example, the call fingerprints generated within minutes, hours, or days from each other may be compared. Thus, one or more embodiments may detect when an inmate is having a message recorded by a third party, which is then played for another inmate. In such a scenario, the communication may be a violation of a rule of the controlled facility.

In Step 1109, data mining on connection parameters of the call is received in accordance with one or more embodiments of the invention. Data mining includes analyzing the connection parameters of the call to detect patterns. For example, the connection parameters that are analyzed may include one or more of the following: a list of all authenticated parties on the communication, a list of voiceprint identifiers and probable individuals that match the voiceprints on the communication, timestamp for the beginning and end of the communication, timestamps for any multiparty call detection events, a list of all telephone numbers or other telecommunications addresses officially connected to the conversation, any dual tone multi-frequency (DTMF) digits detected during the communication, credit card information used to pay for the communication, whether any alarms or flags were set on the communication, which telecommunications carrier was used, investigator notes, language used, call termination status, and other such data.

In one or more embodiments of the invention, the call analysis module may check for a variety of different patterns. For example, the pattern may be one or more inmates who regularly call a specific number at a specific time of day. By way of another example, the pattern may be the same destination telephone number or other telecommunication address having been connected to or from any multiple kiosks or inmate phones. Another example pattern may be non-overlapping calls to the same number, and from multiple inmates, within a specified period of time. Such pattern may indicate that a message might be being relayed verbally by outside parties. By way of another example, the call analysis module may compare suspicious calls, such as calls lasting only a couple of minutes, then check for commonality of connection parameters.

In one or more embodiments of the invention, the pattern detection may be performed, for example, at the outside facility that may service multiple controlled facilities. Specifically, the outside facility may analyze the connection parameters of each of the calls to and from various controlled facilities to detect the patterns. The detection may be in real-time during the call or after the call.

If a pattern is detected, the communications having the pattern may be a violation of a rule of the controlled facility.

In Step 1111, voices on the call are analyzed to determine whether an unauthorized party is on the call in accordance with one or more embodiments of the invention. Specifically, voiceprints of voices on the call may be compared to stored voiceprints. If a match is found, then the individual matching the stored voiceprint is identified. A determination may be made whether the inmate is permitted to communicate with the individual. If the inmate is not permitted to communicate with the individual, then the communication may be a violation of a rule of the controlled facility.

In Step 1113, discussion in the call is analyzed to determine whether improper communications are being performed by the inmate in accordance with one or more embodiments of the invention. For example, the analysis may be performed to detect whether the subject matter of the call is regarding a crime, or if vulgarity, obscenity, nudity, or other such improper communications are transmitted in the call. Specifically, the analysis may be based on the words of the call (e.g., by comparing the words transmitted on the call with known words), visual transmissions (e.g., doing an image analysis to test for nudity or other improper gesture), or other technique. The call analysis module may perform the comparison. Alternatively, a reviewer on the call may perform the comparison. In one or more embodiments of the invention, a user interface may display gang symbols and criminal imagery to guide the reviewer into what constitutes improper communication. Improper communications may be deemed a violation of a rule of the controlled facility.

In Step 1115, a determination is made whether an improper communication is detected in accordance with one or more embodiments of the invention. Specifically, a determination may be made whether any of the tests described above are improper in one or more embodiments of the invention. If an improper communication is received, a notice is transmitted to the investigator in Step 1117 in accordance with one or more embodiments of the invention. The notice may include the rule that was violated, identification of the communication, information about the part of the communication that violated the rule, and/or other information in one or more embodiments of the invention. Additionally or alternatively, the multiparty call may be disconnected in accordance with one or more embodiments of the invention.

In one or more embodiments of the invention, all or a portion of the analysis described in FIG. 11 may be performed. Specifically, some steps of FIG. 11 may be omitted or performed in different orders. Further, one or more steps may be repeated throughout the call in one or more embodiments of the invention. The various analysis may be performed in real-time, during the communication, and/or after the communication completes.

The following is an example in accordance with one or more embodiments of the invention. In the following example, consider the scenario in which Ralf, a hardened criminal in a Texas prison and member of Ruff Gang learns from family members that his house was robbed. He also learns that the thief is being held in a California jail. Knowing that his fellow Ruff Gang member Tony is also in the same California jail, Ralf wants Tony to murder the thief while in jail. However, Ralf knows that inmate-to-inmate communication is prohibited where the inmates are in different controlled facilities. Both Ralf and Jim share a friend in common who is not in jail, and the friend coordinates with the two inmates for them both to call him on his cell phone at roughly the same time. The friend accepts both calls, and then opts to merge the calls, which is a common option on modern mobile phones. The two inmates are then bridged together and they can speak freely to each other to coordinate the murder attempt. Unbeknownst to all parties, the two inmates' calls were accompanied by an inaudible, or barely audible tone that identifies the prisons from which the calls originated. Thus, even though the calls are not directly connected to each other i.e., the calls are bridged), the system is still capable of detecting that an inmate-to-inmate call is occurring. The system may be configured to disconnect the call immediately, but in this case, the call sets off an alert to investigators and the call is allowed to continue for evidence. The investigator is able to listen to the call while it is occurring, such as via a Web-based administration system, and download the call afterward. Through the information in the tones, the investigator has name of both facilities and inmates, and she able to thwart the murder plan.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An apparatus for controlling a call in a first controlled facility, comprising:
   at least one processor;
   at least one network interface;
   a memory;
   a software application, physically stored in the memory, comprising instructions operable to cause the at least one processor and the apparatus to:
      connect an inmate in the first controlled facility to the call when each party of the call is verified;
      test incoming audio on the call to detect a first controlled facility tone from a second controlled facility;
      test incoming audio on the call to detect a second controlled facility tone from the first controlled facility;
      transmit a notification of a first violation by the inmate when the first controlled facility tone is detected in the incoming audio;
      wherein the first controlled facility tone is a first pre-defined pattern continuous, scarcely audible set of tones;
      wherein the second controlled facility tone is a second pre-defined pattern continuous, scarcely audible set of tones; and
      wherein both the first pre-defined pattern continuous, scarcely audible set of tones and the second pre-defined pattern continuous, scarcely audible set of tones are detectable, when both are present on the incoming audio, via bi-modal telephony band pass edge filtering of the incoming audio.

2. The apparatus of claim 1, wherein the software application, physically stored in the memory, further comprises instructions operable to cause the at least one processor and the apparatus to:
   generate a call fingerprint from audio in the call;
   compare the call fingerprint with a plurality of call fingerprints from a plurality of controlled facilities; and
   transmit a notification of a second violation when the call fingerprint matches at least one of the plurality of call fingerprints.

3. The apparatus of claim 1, wherein the software application, physically stored in the memory, further comprises instructions operable to cause the at least one processor and the apparatus to:
   verify each party to the call by:
      obtaining an owner of a telephone number of each party to the call; and
      verifying that the inmate is authorized to communicate with the owner,
      wherein connection of the telephone number to the call is denied when the inmate is not authorized to communicate with the owner.

4. The apparatus of claim 1, wherein the software application, physically stored in the memory, further comprises instructions operable to cause the at least one processor and the apparatus to:
   for each party of the call,
      obtain, during the call, a voiceprint of the party; and
      verify that the inmate is authorized to communicate with the party having the voiceprint,
      wherein connection of the party to the call is suspended when the inmate is not authorized to communicate with the party based on the voiceprint.

5. The apparatus of claim 4, wherein the voiceprint is obtained and is used to verify that the inmate is authorized periodically for each party of the call throughout the call.

6. The apparatus of claim 1, wherein the software application, physically stored in the memory, further comprises instructions operable to cause the at least one processor and the apparatus to:
   analyze a discussion performed over the call to determine a subject matter of the discussion;
   determine, based on the subject matter, whether a second violation is occurring;
   transmit a notification of the second violation when a second violation is occurring.

7. The apparatus of claim 1, wherein the software application, physically stored in the memory, further comprises instructions operable to cause the at least one processor and the apparatus to:
   analyze a discussion performed over the call to determine a subject matter of the discussion;

determine, based on the subject matter, whether a crime is being discussed;
transmit a transcript of the call to an investigator when a crime is being discussed.

8. The apparatus of claim 1, wherein the software application, physically stored in the memory, further comprises instructions operable to cause the at least one processor and the apparatus to:
obtain connection parameters from the call;
perform data mining on connection parameters to determine whether the call violates a rule; and
transmit a notification of the a violation when the call violates a rule.

9. A system for controlling a call in a first controlled facility, comprising:
a computer processor; and
a network application executing on the computer processor and comprising:
a connection module configured to connect an inmate in the first controlled facility to the call when each party of the call is verified; and
a call analysis module configured to:
test first controlled facility incoming audio on the call to detect a first controlled facility tone from a second controlled facility,
test second controlled facility incoming audio on the call to detect a second controlled facility tone from the first controlled facility, and
transmit a notification of a first violation by the inmate when the first controlled facility tone is detected in the incoming audio;
wherein the first controlled facility tone is a first pre-defined pattern continuous, scarcely audible set of tones;
wherein the second controlled facility tone is a second pre-defined pattern continuous, scarcely audible set of tones; and
wherein both the first pre-defined pattern continuous, scarcely audible set of tones and the second pre-defined pattern continuous, scarcely audible set of tones are detectable, when both are present on the incoming audio, via bi-modal telephony band pass edge filtering of the incoming audio.

10. The system of claim 9, wherein the call analysis module is further configured to:
generate a call fingerprint from audio in the call;
compare the call fingerprint with a plurality of call fingerprints from a plurality of controlled facilities; and
transmit a notification of a second violation when the call fingerprint matches at least one of the plurality of call fingerprints tone.

11. The system of claim 9, wherein the network application further comprises:
a party verification module configured to:
verify each party to the call by:
obtaining an owner of a telephone number of each party to the call; and
verifying that the inmate is authorized to communicate with the owner,
wherein connection of the telephone number to the call is denied when the inmate is not authorized to communicate with the owner.

12. The system of claim 9, further comprising:
a datacenter server storing a party voiceprint data relating a party to a voiceprint,
wherein the call analysis module is further configured to:
for each party of the call,
obtain, during the call, the voiceprint of the party; and
verify that the inmate is authorized to communicate with the party having the voiceprint using the party voiceprint data,
wherein connection of the party to the call is suspended when the inmate is not authorized to communicate with the party based on the voiceprint.

13. The system of claim 9, further comprising:
a user interface configured to display inmate attributes of the inmate.

14. The system of claim 9, further comprising:
a data center configured to store audit data and a saved communication captured from the call.

15. A non-transitory computer readable medium for controlling a call in a first controlled facility, the non-transitory computer readable medium comprising computer readable program code for:
connecting an inmate in the first controlled facility to the call when each party of the call is verified;
testing first controlled facility incoming audio on the call to detect a first controlled facility tone from a second controlled facility;
testing second controlled facility incoming audio on the call to detect a second controlled facility tone from the first controlled facility;
transmitting a notification of a first violation by the inmate when the first controlled facility tone is detected in the incoming audio;
wherein the first controlled facility tone is a first pre-defined pattern continuous, scarcely audible set of tones;
wherein the second controlled facility tone is a second pre-defined pattern continuous, scarcely audible set of tones; and
wherein both the first pre-defined pattern continuous, scarcely audible set of tones and the second pre-defined pattern continuous, scarcely audible set of tones are detectable, when both are present on the incoming audio, via bi-modal telephony band pass edge filtering of the incoming audio.

16. The non-transitory computer readable medium of claim 15, further comprising computer readable program code for:
for each party of the call,
obtaining, during the call, a voiceprint of the party; and
verifying that the inmate is authorized to communicate with the party having the voiceprint,
wherein connection of the party to the call is suspended when the inmate is not authorized to communicate with the party based on the voiceprint.

17. A non-transitory computer readable medium for controlling a multiparty call in a detention center, the non-transitory computer readable medium comprising computer readable program code for:
receiving a request to connect an inmate in the detention center to a plurality of parties in the multiparty call;
verifying that each party of the plurality of parties is authorized to speak with the inmate;
verifying that each party of the plurality of parties accepts the multiparty call before being connected to the inmate; and
connecting each party that is authorized and that accepts to the multiparty call;
wherein incoming audio from the multiparty call includes a first detention center pre-defined pattern continuous, scarcely audible set of tones;

wherein incoming audio from a party of the plurality of parties includes a second detention center pre-defined pattern continuous, scarcely audible set of tones; and wherein both the first detention center pre-defined pattern continuous, scarcely audible set of tones and the second detention center pre-defined pattern continuous, scarcely audible set of tones are detectable, when both are present on the incoming audio, via bi-modal telephony band pass edge filtering of the incoming audio.

18. The non-transitory computer readable medium of claim 17, wherein the plurality of parties are selected by the inmate.

19. The non-transitory computer readable medium of claim 17, where the plurality of parties are selected by a party of the plurality of parties.

* * * * *